(12) United States Patent
Lyons et al.

(10) Patent No.: US 7,560,046 B2
(45) Date of Patent: Jul. 14, 2009

(54) SCINTILLATOR MATERIAL AND RADIATION DETECTORS CONTAINING SAME

(75) Inventors: Robert Joseph Lyons, Burnt Hills, NY (US); Venkat Subramaniam Venkataramani, Clifton Park, NY (US); Anant Achyut Setlur, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 244 days.

(21) Appl. No.: 11/315,956

(22) Filed: Dec. 22, 2005

(65) Prior Publication Data

US 2007/0187645 A1 Aug. 16, 2007

(51) Int. Cl.
C09K 11/06 (2006.01)
C09K 11/02 (2006.01)
C09K 11/77 (2006.01)
C09K 11/61 (2006.01)

(52) U.S. Cl. .......................... 252/301.17; 252/301.18; 252/301.4 R; 252/301.4 H

(58) Field of Classification Search .......... 252/301.4 R, 252/301.17, 301.18, 301.4 H
See application file for complete search history.

(56) References Cited

U.S. PATENT DOCUMENTS

| | | | |
|---|---|---|---|
| 4,093,890 A | 6/1978 | Verriet et al. | |
| 6,246,744 B1 * | 6/2001 | Duclos et al. | 378/19 |
| 6,315,923 B1 | 11/2001 | Devenney et al. | |
| 6,479,420 B2 * | 11/2002 | Nakamura | 501/152 |
| 6,630,077 B2 | 10/2003 | Shiang et al. | |
| 6,793,848 B2 * | 9/2004 | Vartuli et al. | 252/301.4 R |
| 7,094,362 B2 * | 8/2006 | Setlur et al. | 252/301.4 F |
| 2003/0127630 A1 | 7/2003 | Vartuli et al. | |
| 2004/0062699 A1 * | 4/2004 | Oshio | 423/263 |
| 2004/0084655 A1 | 5/2004 | Vartuli et al. | |
| 2004/0146138 A1 * | 7/2004 | Jiao | 378/19 |
| 2005/0019241 A1 * | 1/2005 | Lyons | 423/263 |
| 2005/0093431 A1 * | 5/2005 | Hancu et al. | 313/503 |
| 2006/0219927 A1 | 10/2006 | Venkataramani et al. | |

\* cited by examiner

*Primary Examiner*—Karl E Group
*Assistant Examiner*—Noah S Wiese
(74) *Attorney, Agent, or Firm*—Francis T. Coppa

(57) ABSTRACT

A sintered, annealed scintillator composition, which, prior to annealing, has a formula of $A_3B_2C_3O_{12}$, where A is at least one member of the group consisting of Tb, Ce, and Lu, or combinations thereof, B is an octahedral site (Al), and C is a tetrahedral site (also Al). One or more substitutions are included. The substitutions may may be partial or, in some cases, complete, and can include Al with Sc at B, up to two atoms of oxygen with fluorine and the same number of Ca atoms at A, replacement at B with Mg and the same number of atoms of oxygen with fluorine, replacement at B with a combination of Mg/Si Mg/Zr, Mg/Ti, and/or Mg/Hf, replacement at B with a combination of Li/Nb and/or Li/Ta, and at A with Ca and replacement of an equal number of B or C with silicon.

4 Claims, 1 Drawing Sheet

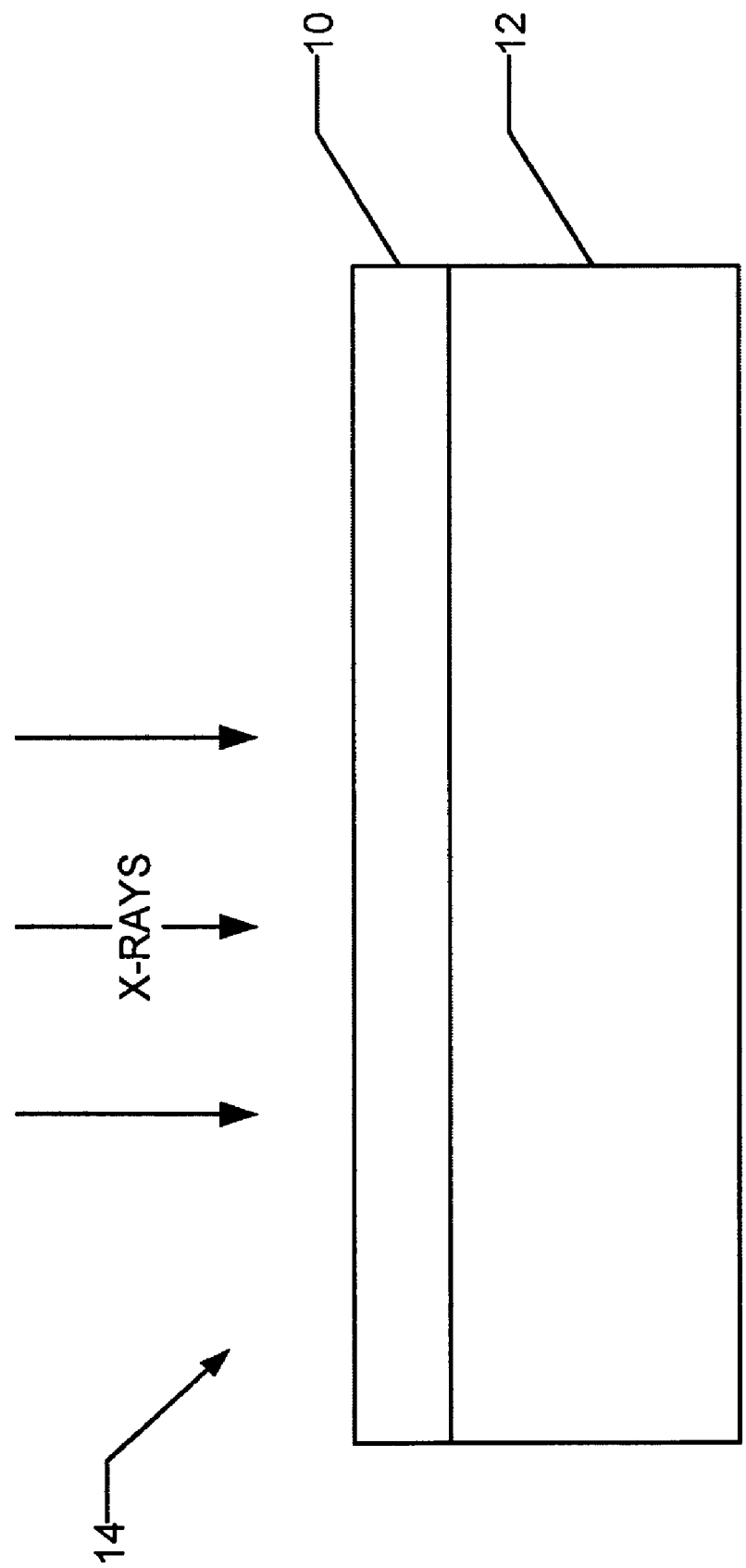

SCINTILLATOR MATERIAL AND RADIATION DETECTORS CONTAINING SAME

BACKGROUND OF THE INVENTION

This invention relates generally to scintillator materials useful for radiation detectors and for radiation detectors made therewith, and more particularly to scintillator materials that can be used in thin slices and/or processed at a relatively low temperature, and radiation detectors made therewith.

Solid state scintillator materials have long been used as radiation detectors to detect penetrating radiation in such applications as x ray counters and image intensifiers. The scintillator materials emit visible or near visible radiation when stimulated by x rays or other high energy electromagnetic photons. In typical medical or industrial applications, the optical output from the scintillator is directed to a photoelectrically responsive device to produce electrical output signals, where the amplitude of the signals is proportional to the deposited energy. The electrical signals can than be digitized by a computer for display on a screen or other permanent medium. Such detectors play an important role in computerized tomography (CT) scanners, digital radiography (DR), and other x ray, gamma radiation, ultraviolet radiation, and nuclear radiation detecting applications. In medical applications, it is especially desirable that the scintillator efficiently absorb nearly all the x rays that pass through a patient, so that the detector utilizes a maximal amount of the high energy administered, and the patient is not subject to a higher radiation dose than necessary.

Among the preferred scintillator compositions in the present generation of CT scanners are ceramic scintillators that employ at least one of the oxides of lutetium, yttrium, and gadolinium as matrix materials. These are described in detail, for example, in U.S. Pat. Nos. 4,421,671, 4,473,513, 4,525, 628, and 4,783,596. These scintillators typically comprise a major proportion of yttria ($Y_2O_3$), up to about 50 mole percent gadolinia ($Gd_2O_3$), and a minor activating proportion (typically about 0.02-12, preferably about 1-6 and most preferably about 3 mole percent) of a rare earth activator oxide. Suitable activator oxides, as described in the aforementioned patents, include the oxides of europium, neodymium, ytterbium, dysprosium, terbium, and praseodymium. Europium-activated scintillators are often preferred in commercial X ray detectors because of their high luminescent efficiency, low afterglow level, and other favorable characteristics.

Another important consideration for scintillators is to reduce damage that occurs to the scintillator upon repeated exposure of the scintillator to high energy radiation. Radiographic equipment employing solid state scintillator materials for the conversion of high energy radiation to an optical image may experience changes in efficiency after exposure of the scintillator to high dosages of radiation. For example, radiation damage for bismuth germanate single crystal scintillators may be as high as 11% after a thirty minute exposure to ultraviolet radiation from a mercury lamp. Similar results are reported for higher energy gamma radiation. Furthermore, the variation in radiation damage from crystal to crystal of bismuth germanate scintillators is high, approximating a factor of at least 30. A similar change in efficiency can be found when polycrystalline type ceramic scintillators are exposed to high energy radiation dosages.

Radiation damage in scintillators is characterized by a change in light output and/or a darkening in color of the scintillator body with prolonged exposure to radiation. Radiation damage can lead to "ghost images" from prior scans which thereby reduce image resolution. The change in light output that occurs upon radiation damage is often found to be variable in magnitude from batch-to-batch of the same scintillator, making it difficult to predict how any individual scintillator will change over time and thus, making it difficult to implement quantitative correction measures. For example, yttria-gadolinia ceramic scintillators activated with europium exhibit a reduction in light output of 4 to 33%, depending upon the scintillator batch, for 450 roentgens of 140 kVP x rays. This amount of variation in light output which can occur as a result of x ray damage is undesirable in a quantitative x ray detector.

Moreover current non-water soluble scintillator materials are difficult to manufacture, owing to their high melting points and the thickness of the scintillator coating that has to be applied to stop X-rays from reaching and damaging the detector. The thick coatings also result in inefficient optical transmission.

BRIEF DESCRIPTION OF THE INVENTION

The present invention, in one aspect, provides a sintered, annealed scintillator composition. The composition includes, prior to annealing, a garnet having a formula of $A_3B_2C_3O_{12}$, where A is at least one member of the group consisting of Tb, Ce, and Lu, or combinations thereof, B is an octahedral site (Al), and C is a tetrahedral site (also Al). The garnet includes at least one substitution selected from the group consisting of (1) replacement in the formula of between 0.05 up to 2 atoms of Al with Sc, at the octahedral site B, (2) replacement in the formula of between 0.005 up to two atoms of oxygen with fluorine and replacement of the same number of Ca atoms at the A-site, (3) replacement in the formula of between 0.005 and 2 atoms at site B with Mg and replacement of the same number of atoms of oxygen with fluorine, (4) replacement in the formula of between 0.005 up to two atoms at site B with atoms from at least one combination selected from the group consisting of Mg/Si Mg/Zr, Mg/Ti, and Mg/Hf, (5) replacement in the formula of between 0.005 up to two atoms at site B with atoms from at least one combination selected from the group consisting of Li/Nb and Li/Ta, and (6) replacement in the formula of between 0.005 up to two atoms at the A-site with Ca and replacement of an equal number of B or C sites with silicon.

a garnet having a formula of A3B2C3O12, where A is at least one member of the group consisting of Tb, Ce, and Lu, or combinations thereof, B is an octahedral site (Al), and C is a tetrahedral site (also Al), with at least one substitution selected from the group consisting of:

(1) replacement in the formula of between 0.05 up to 2 atoms of Al with Sc, at the octahedral site B;

(2) replacement in the formula of between 0.005 up to two atoms of oxygen with fluorine and replacement of the same number of Ca atoms at the A-site;

(3) replacement in the formula of between 0.005 and 2 atoms at site B with Mg and replacement of the same number of atoms of oxygen with fluorine;

(4) replacement in the formula of between 0.005 up to two atoms at site B with atoms from at least one combination selected from the group consisting of Mg/Si Mg/Zr, Mg/Ti, and Mg/Hf;

(5) replacement in the formula of between 0.005 up to two atoms at site B with atoms from at least one combination selected from the group consisting of Li/Nb and Li/Ta; and (6) replacement in the formula of between 0.005 up to two atoms at the A-site with Ca and replacement of an equal number of B or C sites with silicon;

wherein said substituted composition A is sintered at 1725° C. prior to annealing.

Various configurations of the present invention provide short decay times and have reduced damage upon exposure to high-energy radiation relative to known scintillator compositions. Additionally, configurations of scintillator compositions of the present invention have higher densities than known scintillator compositions, thus providing a higher radiation stopping power to prevent damage to semiconductor detector arrays on which the scintillator compositions are deposited.

BRIEF DESCRIPTION OF THE DRAWING

The FIGURE represents a cross-section of a radiation detector configuration of the present invention.

DETAILED DESCRIPTION OF THE INVENTION

The terms "phosphor" and "scintillator" are used in an interchangeable way to mean a solid-state luminescent material that emits visible light in response to stimulation by high-energy radiation such as X, β, or γ radiation.

The term "high-energy radiation" means electromagnetic radiation having energy higher than that of ultraviolet radiation, including but not limited to, X radiation (also referred to as x ray radiation herein), gamma (γ) radiation, and beta (β) radiation. Solid-state scintillator materials are in common use as components of radiation detectors in apparatuses such as counters, image intensifiers, and computed tomography ("CT") scanners.

The term "radiation damage" refers to the characteristic of a luminescent material in which the quantity of light emitted by the luminescent material in response to a given intensity of stimulating radiation changes after the material has been exposed to a high-energy radiation dose. The term "radiation damage" may also describe the change of scintillation efficiency due to defects created in the scintillator by the radiation dose.

As used herein, the term "light output" is the quantity of visible light emitted by the scintillator after being excited by a pulse of high energy radiation such as X ray radiation and the like.

The term "afterglow" is the light emitted by the scintillator at a defined time after the x ray excitation ceases, reported as a percentage of the light emitted while the scintillator is excited by the X radiation. As used here, the defined time is 100 milliseconds.

The term "decay time," "primary decay," or "primary speed" is the time required for the intensity of the light emitted to decrease to about 36.8% (or 1/e) of the light intensity at the time after the high-energy excitation ceases.

The term "stopping power" refers to the ability of a material to absorb X-radiation; this is also commonly called attenuation or absorption. A material having a high stopping power allows little or no X-radiation to pass through. The stopping power is proportional to the density of the scintillator and the elements contained therein. Thus, it is advantageous to produce scintillators having high density.

The present invention relates to certain substitutions in terbium or lutetium aluminum oxide garnet X ray scintillators activated with a rare earth metal ion, such as cerium, and treated by heating (annealing) at high temperatures and in a defined oxygen atmosphere during or after sintering to reduce radiation damage that would otherwise occur when the scintillator material is exposed to high energy radiation. More particularly, some configurations of the present invention comprise a chemical mixture, solution, or compound resulting from the combination of an active scintillator (terbium lutetium aluminum garnet, or "LuTAG") with a high density garnet. Such a composition has an advantage of enabling a scintillator to be deposited on a detector array to be thinner, while still stopping (and hence, protecting the detector array from) x-rays that would otherwise be passed by known scintillator compositions. In addition, the thinner scintillator composition allows optical transmission of scintillations to be more efficient because there is less material to transverse. Also, less light bounces off edges of the scintillator as the light travels towards a detector diode. Also, thinner scintillator coatings are easier to manufacture, because less material has to be cut to make detector modules, and it is easier to properly align the modules. Some compositions of the present invention also have a lower melting point resulting from multiple eutectics, and thus are not only easier to manufacture, but require less energy to do so, as well as a lower cost furnace.

The basic crystal structure of rare earth garnets is $A_3B_2C_3O_{12}$, where, in this chemical formula, A is a distorted cubic type (usually Tb, Ce, and/or Lu), B is an octahedral site (usually Al), and C is a tetrahedral site (usually Al). However, in some configurations of the present invention, the low stopping power of Al is replaced with a chemical element having higher stopping power. Stopping power scales with Z (atomic number), so a suitable element of higher atomic number is selected. The number of allowed substitutions is dependent upon ionic radius and types and depends further on charge balance. Suitable substitutions used in some configurations of the present invention include:

(1) Replacement of up to 2 atoms of Al in the formula with Sc, in the octahedral site B. In some configurations of the present invention, either one or two Al atoms are replaced with Sc atoms stoichiometrically, but non-stoichiometric mixtures in any range between one and two atoms and also any range between greater than zero (e.g., 0.05) and two atoms (e.g., between x and y, where x is selected from 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, or 1.9, and y is selected to be greater than x and selected from 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0) are expected to give adequate results.

(2) Replacement in the formula of oxygen with fluorine, and A-site atoms with Ca (this substitution works because Ca and F introduce a charge balance), wherein between greater than zero (e.g., 0.005) up to about 1 atom (e.g., between x and y, where x is selected from 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, or 1.9, and y is selected to be greater than x and selected from 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0) on the A-site is substituted. An equal number of atoms at site A are replaced with Ca as are oxygen atoms with fluorine to create the charge balance.

(3) Replacement in the formula of oxygen with fluorine, and B-site atoms with Mg (this substitution works because Mg and F introduce a charge balance), wherein between 0.005 up to 2 atoms are substituted on the B site (e.g., between x and y, where x is selected from 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, or 1.9, and y is selected to be greater than x and selected from 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0). An equal number of atoms at site B are replaced with Mg as are oxygen atoms with fluorine to create the charge balance.

(4) Replacement in the formula of between greater than zero (e.g., 0.005) up to two atoms on B-sites with a 2+/4+ combination, such as, by way of example only, Mg/Si, Mg/Zr, Mg/Ti, or Mg/Hf, the latter providing the greatest stopping power of the pairs listed. For example, in some configurations, the total number of atoms substituted on the B sites is between x and y, where x is selected from greater than zero, e.g., 0.005, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, or 1.9, and y is greater than x and is selected from, e.g., 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0);

(5) Replacement in the formula of between 0.005 up to two atoms on B-sites with a 1+/5+ combination, such as, by way of example only, Li/Nb or Li/Ta, the latter providing the greatest stopping power of the two listed (e.g., the total number of atoms substituted on the B sites is between x and y, where x is selected from 0.005, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, or 1.9, and y is selected to be greater than x and selected from 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0); and/or (6) Replacement of greater than zero and up to two atoms at A sites with Ca and replacement of an equal number of B or C sites with Si, e.g., the number of Ca atoms substituted at A sites is between x and y, where x is selected from 0.005, 0.1, 0.2, 0.3, 0.4, 0.5, 0.6, 0.7, 0.8, 1.0, 1.1, 1.2, 1.3, 1.4, 1.5, 1.6, 1.7, 1.8, or 1.9, and y is selected to be greater than x and selected from 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0.

In the following table, LO=% of light generated with 60 kvp, 5 ma x-ray, measure with photodiode, compared to standard LuTAG; AG=% of light generated 100 ms after a 60 kvp, 50 ma x-ray pulse of 0.5 sec; and RD=% change in light generated after a 120 kvp, 250 mA, 12 sec dose, using a tickle pulse of 60 kvp, 5 ma, 0.5 sec. All annealed samples were annealed in air at 1200 C for approximately 24 hrs. Also, in the following samples, the "LuTAG" composition used did not have basic $A_3B_2C_3O_{12}$ formula or $(Tb, Lu, Ce)_3Al5O_{12}$ where B=C=Al. Instead, the LuTAG used was intentionally made slightly off stoichiometry to better satisfy certain scintillator properties. Instead of stoichiometric LuTAG, a second phase of perovskite $(Tb, Ce)AlO_3$ was used in a matrix of $(Tb, Lu, Ce)_3Al_5O_{12}$.

sition of the present invention 10 is deposited or otherwise placed on or essentially adjacent to a semiconductor array 12 comprising one or more light-sensitive elements to form an x-ray detector 14. Detector 14 can utilize a thin coating of scintillator 10 to provide effective x-ray detection, yet still be highly resistant to damage.

Annealing is conducted in a controlled (i.e. defined) atmosphere. Generally, the annealing occurs in the presence of oxygen. Preferably, the controlled oxygen atmosphere comprises an oxygen partial pressure in the range from about $1 \times 10^{-18}$ to about 1 atmosphere (atm). Preferably, the controlled oxygen atmosphere comprises an oxygen partial pressure in the range from about $1 \times 10^{-13}$ to about 1 atm. More preferably, the controlled oxygen atmosphere comprises an oxygen partial pressure in the range from about $1 \times 10^{-8}$ to about 0.5 atm. Even more preferably, the controlled oxygen atmosphere comprises an oxygen partial pressure in the range from about $1 \times 10^{-6}$ to about 0.22 atm.

Also preferably, the annealing temperature comprises a range from 1000° C. to 1500° C. The annealing step may be conducted during the normal cooling step which occurs after firing the scintillator material. Alternatively, the annealing may be conducted on a scintillator that has already been cooled to room temperature (i.e. by reheating). Preferably, the time period for annealing comprises a range of from 0.5 to about 24 hours (h).

The scintillator is preferably cooled to room temperature after the annealing step. Preferably, the rate of cooling ranges between 150° C. and 500° C. per hour. More preferably, a cooling rate of about 300° C. per hour is used.

The application of annealing in the presence of oxygen decreases the susceptibility of rare earth activated terbium or lutetium containing garnet scintillators to radiation-induced damage. The rare earth activated terbium or lutetium containing garnet scintillators are especially desirable because of their relatively short decay rates which as discussed herein, allow for CT systems having faster scan time.

In an embodiment, the annealing step changes the oxygen content of said scintillator. Although the exact amount of the change is difficult to quantify, it is believed that a small All samples .05Lu, .0051Ce, .3755 ratio, sintered at 1725 C.

| Formula | Light Output (Annealed) | Afterglow (Annealed) | Rad. Damage (Annealed) |
|---|---|---|---|
| $Tb_{2.9489}Lu_{.05}Ce_{.0051}Sc_2Al_{2.996}O_{12}$ | 0.192 | 0.0035 | −0.62 |
| $Tb_{2.9489}Lu_{.05}Ce_{.0051}Sc_2Al_{2.996}O_{12}$ | 0.190 | 0.0037 | −0.52 |
| $Tb_{2.9489}Lu_{.05}Ce_{.0051}Sc_2Al_{2.996}O_{12}$ | 0.189 | <0.001 | −0.64 |
| $Tb_{2.9489}Lu_{.05}Ce_{.0051}ScAl_{3.996}O_{12}$ | 0.201 | 0.0357 | −1.03 |
| $Tb_{2.9489}Lu_{.05}Ce_{.0051}ScAl_{3.996}O_{12}$ | 0.208 | 0.0347 | −0.90 |
| $Tb_{2.9489}Lu_{.05}Ce_{.0051}Ca_{.005}Al_{4.996}O_{11.995}F_{.005}$ | 0.545 | 0.0209 | 0.37 |
| $Tb_{2.9489}Lu_{.05}Ce_{.0051}Ca_{.005}Al_{4.996}O_{11.995}F_{.005}$ | 0.562 | 0.0198 | 0.40 |

Configurations of scintillator composition of the present invention have short decay times and have reduced damage upon exposure to high-energy radiation relative to known scintillator compositions. Additionally, configurations of scintillator compositions of the present invention have higher densities than currently used scintillator compositions for CT scanners, thus providing a higher radiation stopping power to prevent damage to semiconductor detector arrays on which the scintillator compositions are deposited. For example, and referring to the Figure, a configuration of scintillator compochange in oxygen stoichiometry may occur upon treatment of garnet scintillators by the method of the present invention.

Radiation damage (RD) may be quantified by measuring change in the intensity of light output before and after a high energy radiation dose, where $I_I$ is the initial (pre-radiation dose) intensity of light output and $I_F$ is the final (post-radiation dose) intensity of light output. Thus, the percent radiation damage (% RD)=$[(I_F-I_I)/I_I] \times 100$. It can be seen that an increase in light output after a high-energy radiation treatment comprises a positive RD value and a decrease in light output after the radiation treatment comprises a negative RD value. However, the closer the RD value is to zero (negative or positive), the better the scintillator responds to high energy radiation without having a change in efficiency. Generally, RD values ranging from +2 to −2 percent are preferred, with values of +1 to −1 percent more preferred, and values from +0.5 to −0.5 percent even more preferred.

Radiation damage to scintillators changes the efficiency by which the scintillator is able to convert high-energy excitation radiation to a measurable signal. Thus, it is important to develop scintillators that are resistant to radiation damage so that the sensitivity of the scintillator to exciting radiation remains substantially constant over a long-term use. Stability and reproducibility of light output of a scintillator is critical to many applications. For example, radiation damage can lead to "ghost images" from prior scans which thereby reduce image resolution. Because the variation in scintillator response that occurs upon radiation damage is highly variable, it is difficult to develop quantitative correction measures. The amount and variation in scintillator efficiency that results upon x ray damage is generally undesirable in a quantitative x ray detector and limits the applicability of such imaging techniques.

Radiation damage causes defects in the scintillator that can then modify the scintillation efficiency for a specific radiation dose. Such defects are commonly color centers that have an electronic structure that imparts optical absorption bands at the scintillator emission wavelengths. The binding energy of the color center determines the longevity of the damage, but in general, this energy is sufficiently large that damage can last from seconds to days at room temperature.

It is difficult to account for the effects of radiation damage when using scintillators for radiographic imaging and thus, it is desirable to develop scintillators that show minimal change in efficiency upon exposure to high-energy radiation. Radiation damage is characterized experimentally by exposing the scintillator to a relevant dose of radiation and measuring the change in light output taken before and after the damage dose. The recovery can be plotted as a function of time after the end of the damage pulse. Such information may be used to distinguish radiation damage due to color center absorption or other defect centers that decrease activator emission efficiency, but is not particularly informative in predicting how a particular scintillator will respond when used clinically.

Also, several factors are important to quantifying the effect of radiation damage on scintillator function. For accurate measurements, it is important to compensate for variations in the source creating the measurement pulses. Also, scintillators with high afterglow must be compensated for residual afterglow from the radiation dose. In addition, since the absorption of the scintillation light depends on path length through the crystal, the measured damage can depend on scintillator geometry, such as crystal thickness and transparency. Also, although radiation damage typically decreases scintillation efficiency, there are some cases, e.g., CsI:Tl scintillators, where the efficiency increases. Although not fully understood, it is believed that such increased efficiency may result from the modification or neutralization of defect centers that would otherwise reduce a scintillator's efficiency.

It will thus be appreciated that configurations of the present invention provide short decay times and have reduced damage upon exposure to high-energy radiation relative to known scintillator compositions. Additionally, configurations of scintillator compositions of the present invention have higher densities than known scintillator compositions, thus providing a higher radiation stopping power to prevent damage to semiconductor detector arrays on which the scintillator compositions are deposited.

While the invention has been described in terms of various specific embodiments, those skilled in the art will recognize that the invention can be practiced with modification within the spirit and scope of the claims.

What is claimed is:

1. A sintered, annealed scintillator composition comprising, prior to annealing: $Tb_{2.9489}Lu_{0.05}Ce_{0.0051}Ca_{0.005}Al_{4.996}O_{11.995}F_{0.005}$.

2. A composition in accordance with claim 1 on or essentially adjacent a semiconductor detector matrix so as to form, in combination therewith, an x-ray detector array.

3. A composition in accordance with claim 1, annealed in air at 1200° C. for approximately 24 hours.

4. A composition in accordance with claim 3 sintered at 1725° C. prior to annealing.

* * * * *